United States Patent [19]

Lauta et al.

[11] Patent Number: 5,838,261
[45] Date of Patent: Nov. 17, 1998

[54] DEVICE FOR MONITORING A COMPLEX SYSTEM SUCH AS AN AIRCRAFT

[75] Inventors: Raymond Lauta, Toulouse; Lydie Lejarre Tatham, La Salvetat Saint Gilles, both of France

[73] Assignee: Aerospatiale Societe Nationale Industrielle, Paris, France

[21] Appl. No.: 768,989

[22] Filed: Dec. 18, 1996

[30] Foreign Application Priority Data

Dec. 22, 1995 [FR] France .................................. 95 15351

[51] Int. Cl.$^6$ .................................................. G08B 21/00
[52] U.S. Cl. ......................... 340/945; 340/971; 340/525; 701/29; 701/33
[58] Field of Search ..................................... 340/945, 525, 340/461, 463, 462, 519, 520, 521, 973, 825.5, 971; 345/117; 701/14, 15, 29, 16, 35, 33; 371/5.1

[56] References Cited

U.S. PATENT DOCUMENTS

| | | | |
|---|---|---|---|
| 3,678,256 | 7/1972 | Harenberg, Jr. ............................ | 701/16 |
| 4,635,030 | 1/1987 | Rauch ...................................... | 340/945 |
| 4,845,495 | 7/1989 | Bollard et al. ........................... | 340/973 |
| 5,239,468 | 8/1993 | Sewersky et al. ........................ | 701/35 |
| 5,475,594 | 12/1995 | Oder et al. ................................ | 701/14 |
| 5,610,923 | 3/1997 | Callay ...................................... | 371/5.1 |

FOREIGN PATENT DOCUMENTS

| | | |
|---|---|---|
| A-0407179 | 1/1991 | European Pat. Off. . |
| A-0580474 | 1/1994 | European Pat. Off. . |
| WO-A-9509103 | 4/1995 | WIPO . |
| WO-A-9526012 | 9/1995 | WIPO . |

OTHER PUBLICATIONS

IEEE Proceedings of the 26th Conference on Decision and Control, Dec. 1987, "An Evaluation of a Real–Time Fault Diagnosis Expert System for Aircraft Applications", pp. 1941–1947.
French Search Report dated Sep. 25, 1996, 3 pages.

Primary Examiner—Benjamin C. Lee
Attorney, Agent, or Firm—Marshall, O'Toole, Gerstein, Murray & Borun

[57] ABSTRACT

A device for monitoring a complex system includes a central unit for transmitting monitoring information to a display unit, the display unit displaying messages concerning the information received. The central unit is loaded with a database containing additional information. At the time of transmitting monitoring information it indicates the existence of additional information. The display unit displays a signal indicating the existence of the additional information.

6 Claims, 1 Drawing Sheet

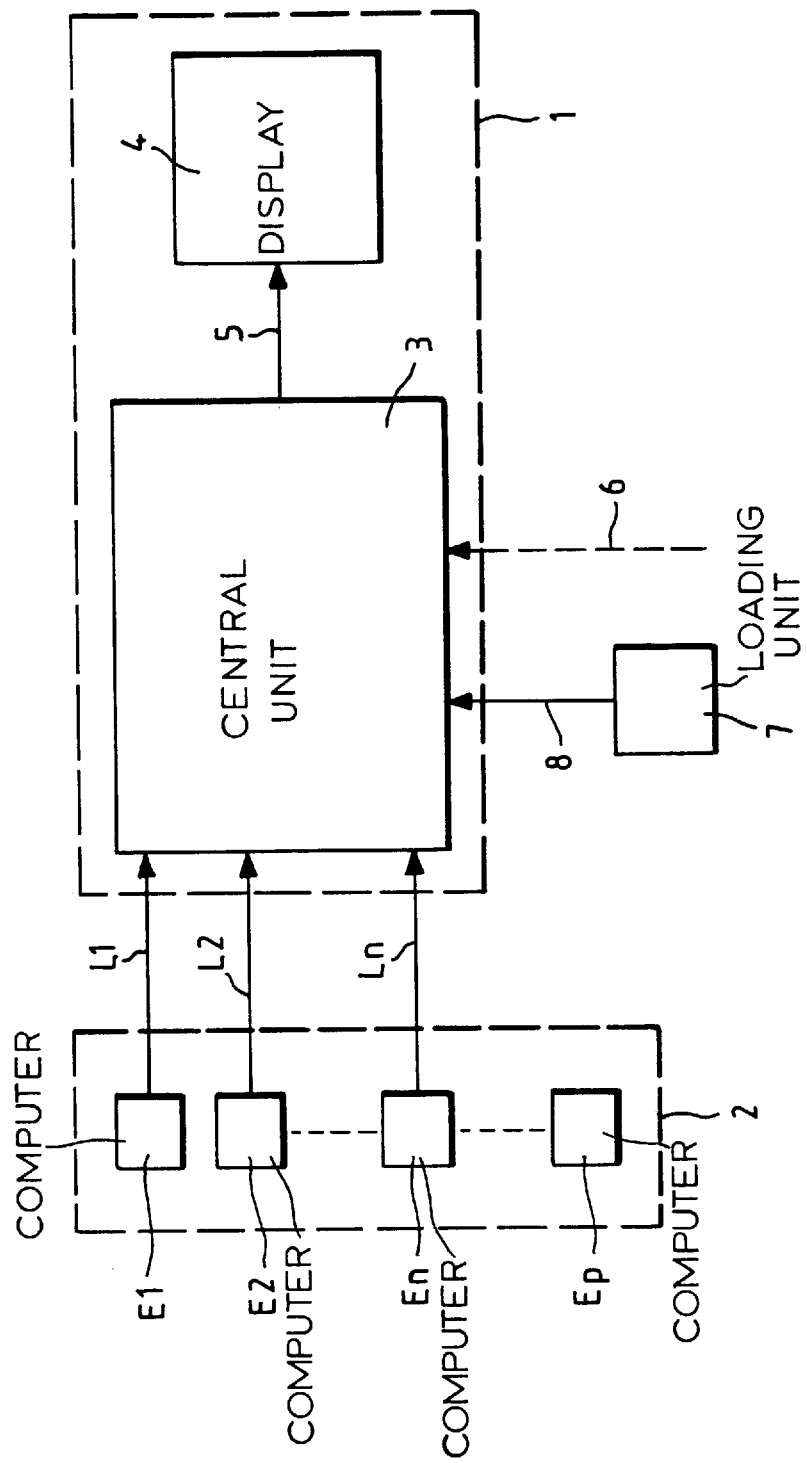

DEVICE FOR MONITORING A COMPLEX SYSTEM SUCH AS AN AIRCRAFT

BACKGROUND OF THE INVENTION

1. Field of the invention

The present invention concerns a device for monitoring a complex system.

In the context of the present invention, by "complex system" is meant a system comprising a plurality of interconnected units, in particular computers, the operation of which is monitored by a centralized monitoring device. Complex systems of this kind monitored by a monitoring device are found in highly varied fields of activity, such as in industry, in automobiles and in aviation, for example.

Although the present invention is therefore applicable to very many systems, it is more specifically described hereinafter in the context of an aircraft, more particularly a transport aircraft.

2. Description of the Prior Art

A device for monitoring a complex system, as envisaged in the present invention, generally includes, in a manner that is known in itself:

a central unit connected to at least some of the units of the complex system and adapted to transmit to display means monitoring information including fault information relating to the complex system monitored in this way, either automatically or at the request of an operator of the complex system;

said display means connected to said central unit and adapted to display, each time monitoring information is received from the central unit, a message relating to said monitoring information.

In the context of a transport aircraft, a monitoring device of this kind is intended primarily:

to inform the pilots, generally at their request, of the status of the various units of the aircraft monitored in this way; and/or to send alarm messages, for example if one of said units is defective or is in a state that is incompatible with the current operating status of the aircraft.

Note that the messages sent are often accompanied by proposals or recommendations intended to tell the pilot what to do. These messages and these proposals are defined and refined during the design and development of the aircraft, before it goes into service.

When the aircraft is in service, the messages and the proposals that are sent can prove to be incomplete or even inaccurate.

It is then necessary to add to them or to modify them, using additional information associated with the monitoring information that has to be amended.

However, such amendments are in practise very difficult to implement in the monitoring device.

The solution currently employed, by airlines in particular, is to transmit the corrections to be taken into account to the pilot, or more generally to the operator of the complex system, who has to memorize them. Accordingly, when monitoring information is sent, the pilot or the operator of the complex system must remember whether there is any additional information associated with that monitoring information or not, and if there is they must either remember that additional information or consult the technical documentation concerning it.

This usual solution has the following specific drawbacks:

a high risk of error since the solution is essentially based on the memory capacity of the pilot;

distraction of the pilot's attention from the tasks in hand; and a difficult, in particular time-wasting documentation consultation process.

Consequently, the effectiveness of this prior art solution is essentially dependent on the memory of the pilot, which increases the workload on the pilot.

An object of the present invention is to remedy the above drawbacks. It concerns a device for monitoring a complex system enabling an operator of said complex system to be reliably and directly advised, at the time monitoring information is communicated to them, of the existence of additional information, so reducing the workload of the operator.

SUMMARY OF THE INVENTION

In a device in accordance with the invention for monitoring a complex system, said central unit is loaded with a database that can be updated and is provided with additional information associated with at least some of said monitoring information, before transmitting monitoring information to said display means, said central unit verifies if said database includes additional information associated with said monitoring information to be transmitted, if necessary, said central unit indicates at the time of transmitting said monitoring information the existence of said additional information, and said display means are adapted to display a characteristic signal indicating the existence of additional information, if necessary.

Accordingly, thanks to the invention, the operator of the complex system is advised if necessary and in real time of the existence of additional information and therefore of the necessity to refer to the corresponding technical documentation. Oversights and inaccurate assessment of the real status of the complex system by the operator therefore become improbable.

Additionally, the operator can continue to concentrate on the tasks in hand when monitoring information is sent and rely totally on the information from said monitoring system.

Consequently, when the existence of additional information is indicated, the operator has to consult the technical documentation concerning the additional information. To avoid the need to carry around technical documents, which are usually bulky, generally being in the form of written notes, and/or to avoid the need to consult the documents, which can be awkward and time-consuming, in accordance with one advantageous feature of the invention said database may include, for each item of additional information, all the data concerning that additional information so that it can be consulted directly by an operator of the complex system, this constituting one particularly advantageous embodiment of the invention.

Alternatively, to reduce the workload of said operator even further, said data concerning the additional information and stored in said database may be displayed directly on said display means in addition to said characteristic signal.

The information obtained by monitoring the complex system, in particular when the latter is an aircraft, can obviously change in accordance with its operating mode and its environment. To allow for this, the data of said database is advantageously adapted to suit the environment of the complex system.

Note that in the context of the present invention the characteristic signal for indicating, on the display means, the existence of additional information can take various forms. In particular, it may be a message in words or a particular pictogram.

As previously indicated, the invention is characterized by the possibility of updating said database, obviously as easily and as quickly as possible. In accordance with the invention, this updating can be carried out either manually or using a loading unit.

BRIEF DESCRIPTION OF THE DRAWING

The single FIGURE of the accompanying drawing shows how the present invention may be put into effect. The FIGURE is a diagram showing a monitoring device of the invention associated with a complex system.

DETAILED DESCRIPTION OF THE PREFERRED EMBODIMENT

The monitoring device 1 of the invention shown diagrammatically in the single FIGURE of the drawing monitors a complex system 2 part of which is shown diagrammatically.

In the context of the present invention, by "complex system" is meant a system including a plurality of units E1, E2, . . . , Ep, for example computers, between which there is a very large number of interconnections, not shown in the FIGURE.

Consequently, said complex system may be a railroad network, a nuclear power station or an aircraft, for example a helicopter. The invention is described in more detail hereinafter, by way of example, with reference to a transport aircraft.

In a manner that is known in itself, the monitoring device 1 for a complex system 2 of this kind includes:

a central unit 3 connected to at least some of said units E1 through En of the complex system 2, by respective links L1 through Ln; and display means 4, for example a computer screen, connected by a link 5 to said central unit 3.

Said central unit 3 monitors the units E1 through En to which it is connected and can transmit monitoring information to the display means 4, automatically in some cases or at the request of an operator of the complex system, for example the pilot of a transport aircraft.

When it receives monitoring information, said display means 4 display a message concerning said monitoring information in such a manner as to enable that information to be communicated to the operator monitoring the complex system 2.

The monitoring information communicated in this way is information, in particular fault information, indicating the status of the complex system 2 or of certain units E1 through En of said complex system 2.

When fault information is transmitted, the display means 4 display an alarm message that is generally accompanied by proposals or recommendations, indicating to the operator the conduct required in such a situation, in particular, for a pilot, what he must do.

The messages and the proposals communicated in this way are defined and refined during the design and development of the aircraft. However, these messages and these proposals may prove to be incomplete or even inaccurate subsequently, when the complex system 2 is in service, or at least when the complex system 2 is operating in certain particular environments.

Also, it is often necessary to modify the predefined messages, in particular to adapt them as the complex system 2 evolves.

However, such modifications are extremely difficult to implement on the monitoring device.

Furthermore, the solution currently employed, to allow for the necessary corrections in the monitoring information to be transmitted, consists in communicating to the operator of the complex system 2, for example to the pilot of a transport aircraft, the additional information associated with existing monitoring information, this additional information modifying or complementing the associated monitoring information.

For example, if the manufacturer of an aircraft acquires new information, they send the information out to the airline using the aircraft in the form of a technical document, generally written notes, the airline transmitting this information to the pilots and to the personnel concerned.

Consequently, when monitoring information is sent in flight, the pilot or the copilot must think whether there is any additional information associated with that monitoring information or not. If there is, they must consult the corresponding technical documentation, unless they already know the content of that additional information, of course, which although representing a faster solution presupposes a high workload and a good memory and represents an increased risk of error.

This solution as used at present is not sufficiently reliable, since it essentially relies on the pilot having a good memory.

Moreover, this solution distracts the concentration of the pilot from the tasks in hand, at least to some degree, and in particular from control of the aircraft.

The monitoring device 1 of the invention remedies these drawbacks.

To this end, said monitoring device 1 in accordance with the invention has the following features:

the central unit 3 is loaded with a database containing additional information associated with said monitoring information, said database being easy to update, as described in more detail below;

before transmitting monitoring information to the display means 4, the central unit 3 verifies if said database includes additional information associated with said monitoring information to be transmitted and, if necessary, when it transmits said monitoring information the central unit 3 indicates the existence of this additional information; and the display means 4 are able to display a characteristic signal, for example a message in words or a particular pictogram, indicating the existence of additional information.

In this way, if a message concerning monitoring information is accompanied by said predefined characteristic signal, the pilot is made aware of the need to consult the corresponding technical documentation.

In a first embodiment of the invention, said characteristic signal indicates precisely the references of the technical document containing the additional information concerned but in a second, highly advantageous embodiment of the invention said database includes all of the data relating to the additional information and is implemented in such a manner that it can be consulted directly by the operators of the complex system.

Additionally, in a particularly advantageous third embodiment of the invention, said database also includes all the data concerning the additional information and the monitoring device 1 is adapted to display said data on said display means 4 in addition to said characteristic signal, if necessary.

Accordingly, using the invention, oversights become improbable.

In accordance with the invention, the central unit 3 may be loaded with said database in two different ways, namely:

manually, using a computer terminal connected to said central unit 3 by a link 6; or by a loading unit 7, for example a diskette drive, connected to the central unit 3 by a link 8.

To implement this latter embodiment the manufacturer of the aircraft may transmit additional information that it has acquired to the operating airline on a computer storage medium, for example on a diskette, compatible with the loading unit 7.

Note that on some types of transport aircraft the terminal for communicating with the central unit 3 is installed on the console between the pilot and the copilot so that, in this case, the first loading solution may be more appropriate.

Note further that in many aircraft the central unit 3 is in the form of two alarm computers, not shown. In this case, either both computers may be loaded separately by appropriate devices or one of said computers may be loaded first and the data loaded in this way may then be copied to the other computer also by means of appropriate devices, which highlights the multiplicity of possible implementations of the present invention.

There is claimed:

1. A device for monitoring a complex system, for an aircraft, that includes a plurality of interconnected units, said monitoring device comprising:

a display device;

a central unit connected to at least some of said interconnected units of said complex system and adapted to transmit to said display device monitoring information including fault information relating to the complex system, either automatically or at the request of an operator of the complex system;

said display device being connected to said central unit and being adapted to display, each time monitoring information is received from said central unit, a message relating to said monitoring information, wherein said central unit is loaded with a database that can be updated with additional information associated with at least some of said monitoring information, wherein said central unit is adapted to verify if said database includes updated information before transmitting said monitoring information to said display device, and wherein said central unit indicates to the operator the existence of said updated information at the time of transmitting said monitoring information to said display device.

2. The device claimed in claim 1 wherein said database includes all the data concerning said updated information and is adapted to be consulted directly by an operator of said complex system.

3. The device claimed in claim 1 wherein said database is updated manually.

4. The device claimed in claim 1 wherein said database is updated by means of a loading unit.

5. The device claimed in claim 1 wherein said display device is adapted to display a characteristic signal indicating the existence of said updated information.

6. The device claimed in claim 5 wherein said database includes all the data concerning said updated information and wherein said updated information is displayed on said display device in addition to said characteristic signal.

* * * * *